US008744442B2

(12) United States Patent
Howell et al.

(10) Patent No.: US 8,744,442 B2
(45) Date of Patent: Jun. 3, 2014

(54) APPARATUS, AND ASSOCIATED METHOD, FOR INFORMING DEDICATED MODE CONNECTED MOBILE STATION OF PACKET SERVICE CAPABILITIES IN A COVERAGE AREA

(75) Inventors: Stephen Andrew Howell, Barnwood (GB); Maiyuran Wijayanathan, Waterloo (CA); Noushad Naqvi, Waterloo (CA); Johanna Dwyer, Kanata (CA)

(73) Assignee: BlackBerry Limited, Waterloo (CA)

( * ) Notice: Subject to any disclaimer, the term of this patent is extended or adjusted under 35 U.S.C. 154(b) by 906 days.

(21) Appl. No.: 12/028,497

(22) Filed: Feb. 8, 2008

(65) Prior Publication Data

US 2009/0203366 A1   Aug. 13, 2009

(51) Int. Cl.
*H04W 4/00* (2009.01)

(52) U.S. Cl.
USPC ............. 455/435.2; 455/419; 455/432.1; 455/436; 370/335

(58) Field of Classification Search
USPC ............. 455/419, 432.1, 455, 436; 370/335
See application file for complete search history.

(56) References Cited

U.S. PATENT DOCUMENTS

| 5,613,213 | A | 3/1997 | Naddell et al. | |
|---|---|---|---|---|
| 2001/0051506 | A1* | 12/2001 | Riikonen | 455/67.1 |
| 2002/0037720 | A1* | 3/2002 | Pecen et al. | 455/426 |
| 2003/0007470 | A1* | 1/2003 | Grilli et al. | 370/335 |
| 2004/0137894 | A1* | 7/2004 | Paivike et al. | 455/419 |
| 2005/0148348 | A1* | 7/2005 | Cramby et al. | 455/458 |
| 2005/0153691 | A1* | 7/2005 | Xue et al. | 455/432.1 |
| 2005/0207396 | A1* | 9/2005 | Vaittinen et al. | 370/352 |
| 2006/0007877 | A1* | 1/2006 | Vaittinen et al. | 370/328 |
| 2006/0025151 | A1* | 2/2006 | Karaoguz et al. | 455/455 |
| 2006/0094415 | A1* | 5/2006 | Veron | 455/419 |
| 2006/0239229 | A1* | 10/2006 | Marinescu et al. | 370/331 |
| 2007/0010252 | A1* | 1/2007 | Balachandran et al. | 455/437 |
| 2007/0224990 | A1* | 9/2007 | Edge et al. | 455/436 |
| 2009/0175263 | A1* | 7/2009 | Wijayanathan et al. | 370/352 |
| 2009/0197602 | A1* | 8/2009 | David | 455/436 |
| 2009/0203366 | A1* | 8/2009 | Howell et al. | 455/414.2 |

FOREIGN PATENT DOCUMENTS

| EP | 1734782 A1 * | 12/2006 | | H04Q 7/38 |
|---|---|---|---|---|
| FR | 2895635 A1 | 6/2007 | | |
| WO | 2004077753 A2 | 9/2004 | | |
| WO | 2005053304 A2 | 6/2005 | | |
| WO | 2007117190 A1 | 10/2007 | | |
| WO | WO 2007110659 A1 * | 10/2007 | | H04L 12/56 |

* cited by examiner

*Primary Examiner* — Charles Shedrick

(57) ABSTRACT

An apparatus, and an associated methodology, for identifying to a circuit-switch-connected mobile station with an indication of packet-service capabilities available to a mobile station. A message generator at the network generates a message that includes an indication of the network-entity capabilities with respect to packet communications. A field of the message identifies the packet-service capabilities. A message is sent by the network and detected by a detector of the mobile station. A report is formed indicative of the value contained in the delivered message, and a user display displays an indication of the detected information.

32 Claims, 3 Drawing Sheets

APPARATUS, AND ASSOCIATED METHOD, FOR INFORMING DEDICATED MODE CONNECTED MOBILE STATION OF PACKET SERVICE CAPABILITIES IN A COVERAGE AREA

The present disclosure relates generally to a manner by which to inform a mobile station of data services available in a serving cell or other geographical area. More particularly, the present disclosure relates to an apparatus, and an associated method, by which to inform a dedicated-mode-connected mobile station of packet service capabilities in an area in which a mobile station is positioned.

The mobile station is, e.g., informed whether the mobile station is positioned in an EDGE-capable, or other high-speed packet service area. A message, such as an SI 6 message, is generated and sent to the mobile station to identify whether the serving cell is EDGE-, or other high-speed packet capable. A circuit-switched-connected mobile station need not wait for initiation of a Dual Transfer Mode (DTM) session to learn of packet-switched communication capabilities at the serving cell.

BACKGROUND OF THE INVENTION

Advancements in communication technologies have permitted the development and deployment of many varied types of communication systems. New and improved types of radio communication systems, for instance, have been made possible as a result of such advancements. A cellular mobile radio communication system is an exemplary type of radio communication system that has been made possible as a result of advancements in communication technologies.

A cellular communication system makes relatively efficient use of bandwidth allocations provided for its operation. A cellular communication system typically includes a network infrastructure having a plurality of spaced-apart fixed-site transceivers, referred to as base stations. A mobile station, positioned within the coverage areas, i.e., cells, defined by individual ones of the base stations, communicate with the base station in whose proximity that the mobile station is positioned. Power levels of signals generated pursuant to communications between a mobile station and a base station are relatively low, due to the proximity of the communication devices to one another. And, the same frequencies are reusable at other locations of the area encompassed by the communication system. Cell reuse schemes are typically utilized to minimize the occurrence of co-channel interference when reusing the same channels at different cells defined in the communication system.

As a mobile station typically is permitted mobility, the base station with which a mobile station communicates is dependent upon the positioning of the mobile station. If the mobile station is moved to a new location that forms part of a different cell, communications are handed off between base stations that define the respective cells. Ongoing communications continue, uninterrupted, after the hand off of the communications.

Successive generations of cellular communication systems have been developed and deployed, with each generation taking advantage of technological advancements as they become available. Early-generation systems provided primarily voice communication services and limited data services. Newer-generation systems, in contrast, provide for increasing data-intensive communication services. Newer-generation systems generally provide for packet-based communications as well as circuit-switched communications, used primarily for voice services.

One newer-generation, cellular communication system provides high-speed packet services, referred to as EDGE (Enhanced Data for GSM Evolution) services or EGPRS (Enhanced GPRS) services. A prior-generation cellular communication system, of similar technology type, provides for a lower-speed packet communication service, referred to as GPRS (General Packet Radio Service). Certain areas encompassed by a communication system might provide for EDGE communication services while other areas of the same system might provide merely for GPRS communication services. Other communication systems, using other technologies, might well have certain cells that provide for higher-speed packet communication services and other cells that provide only lower-speed packet communication services.

A user of a mobile station would generally want to know the packet-service capabilities available to the mobile station prior to commencing with a packet-based service. A problem sometimes occurs for the reason that, when the mobile station is operated in a circuit-switched connection, i.e., is connected in a dedicated-mode, existing signaling generally does not provide the mobile station with an indication of the packet-service capabilities available at the location at which the mobile station is positioned. The user of the mobile station might therefore make an erroneous selection to commence with, or not to commence with, a packet communication service without appropriate knowledge of the packet service capabilities.

A manner by which to inform a mobile station, when connected in a dedicated-mode connection, of packet service capabilities available thereto is required.

It is in light of this background information related to communications in a mobile radio communication system that the significant improvements of the present disclosure have evolved.

DETAILED DESCRIPTION

Figure 1:
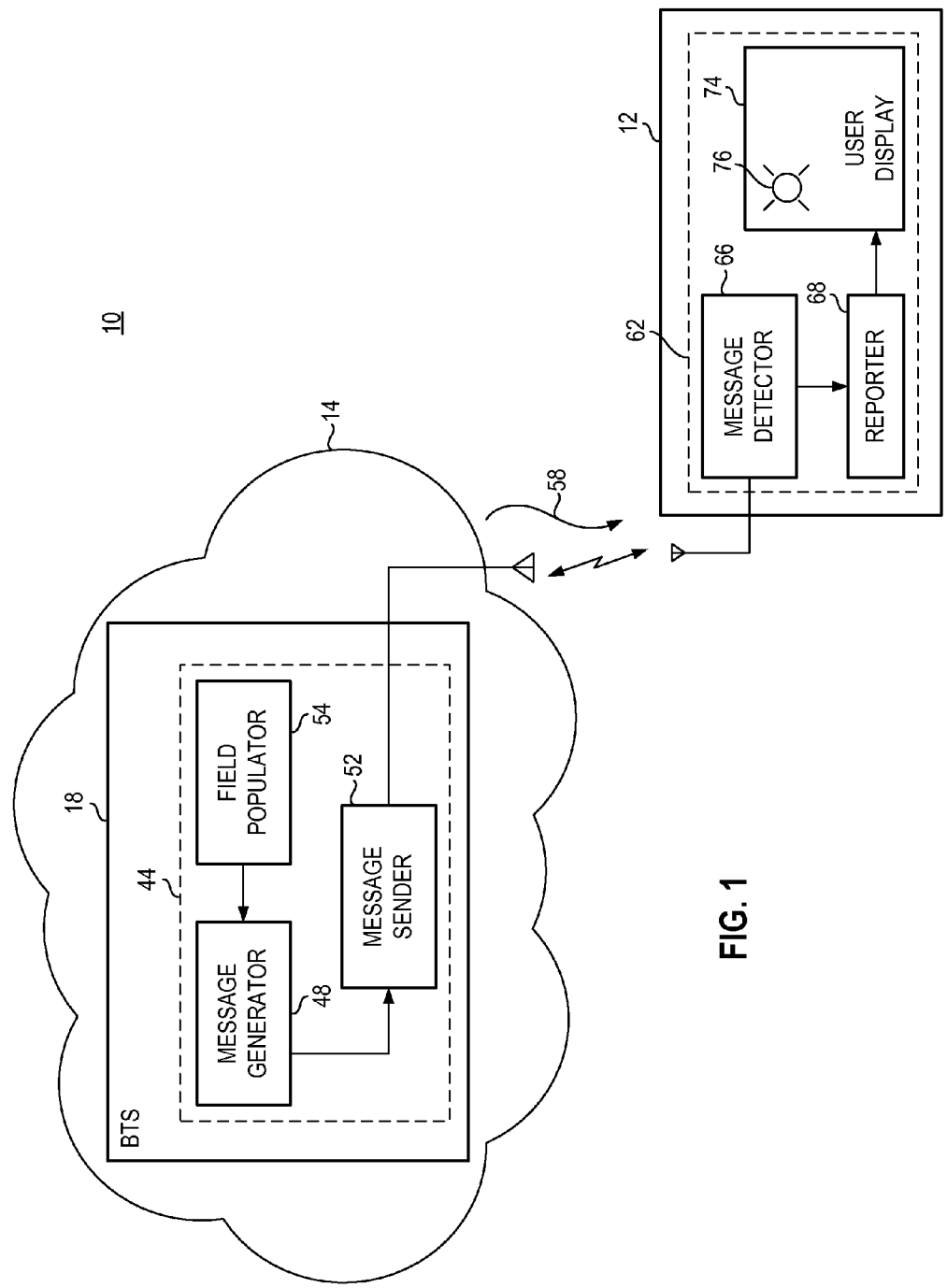
FIG. 1 illustrates a functional block diagram of a radio communication system in which an embodiment of the present disclosure is operative.

The present disclosure, accordingly, advantageously provides an apparatus and an associated method by which to inform a mobile station of data services available in a serving cell, or other geographical area.

Through operation of an embodiment of the present disclosure, a manner is provided by which to inform a dedicated-mode-connected mobile station of packet service capabilities in the area in which the mobile station is positioned.

In one aspect of the present disclosure, the mobile station is informed of whether the mobile station is positioned in an EDGE-capable, or other high-speed packet, service area. A circuit-switched-connected mobile station need not wait for initiation of a dual transfer mode session to learn of packet-switched communication capabilities at the serving cell.

In another aspect of the present disclosure, a message generator embodied at a network entity, such as a base transceiver station, generates a message that includes an indication of whether the network entity provides for high-speed packet identification services. The indication is, e.g., of a first value when the network entity is permitting of the high-speed packet communication services and is of a second value when the network entity is unable to provide the high-speed packet identification service.

In another aspect of the present disclosure, the message, once generated, is sent by a network entity to be detectable by a mobile station when the mobile station is connected in a circuit-switched connection. The message, once detected and analyzed, identifies to the mobile station the packet-switched communication capabilities of the network entity from which the message is sent.

In another aspect of the present disclosure, the message includes a single-bit field populated with a first value to indicate that the network entity is high-speed, packet-capable and is populated with a second single bit value to indicate that the network entity is not high-speed, packet-capable. A populator populates the single-field with the appropriate value.

In another aspect of the present disclosure, a message generator embodied at a network entity generates an SI 6 message that includes an EGPRS support field of a single-bit length. The SI 6 message includes other fields and values that are otherwise conventional. If, e.g., the serving cell supports EGPRS communication services, that is to say, is high-speed packet-service capable, the EGPRS support field is populated with a logical one value, i.e., a high logical value. If, conversely, the serving cell is not EGPRS-capable, then the single-bit field is populated with a logical zero, i.e., a low logical value. By providing the indication in the SI 6 message, the mobile station to which the octet is sent is made aware of the packet-switched, communication capabilities of the serving cell. A decision whether to perform a packet-switched communication service is better made as a user is aware of the packet-service capabilities of the serving cell at which the mobile station is positioned.

In another aspect of the present disclosure, a message detector is provided for a mobile station. The message detector detects a message, while the mobile station is in a circuit-switched connection, i.e., a dedicated-connected-mode. The message delivered to, and detected by, the message detector includes a field that identifies whether the network entity, such as the base station that defines the serving cell in which the mobile station is positioned, is high-speed packet-service capable. The message detected by the message detector includes, for instance, a single-bit field that is populated with a value to indicate whether the serving cell is high-speed, packet-capable. If high-speed packet capable, the single bit field is populated with a first value, and if not so-capable, then the field is populated with a second value.

In another aspect of the present disclosure, the mobile station further includes a reporter that is configured to analyze and report the value populating the field of the message detected at the mobile station. The reporter compares the message indicating the capabilities of the current service area with its own capabilities. If the service area provides enhanced data capabilities and the mobile station supports the same enhanced service capabilities, the reporter subsequently provides an indication that the mobile station is positioned at a location permitting high-speed packet communication services to be performed.

In another aspect of the present disclosure, the mobile station includes a user display capable of displaying an indication of the report generated by the reporter. That is to say, the user display provides for display of an indication of whether the mobile station is positioned at a location that is permitting of high-speed, packet communication services. The display at the user display comprises, for instance, an icon indicating the packet service capability. A user of the mobile station is able quickly to view the icon on the user display, even when the mobile station is connected in a dedicated-mode connection, thereby to be provided with a quick and ready indication of the packet service capabilities available to the mobile station.

In these and other aspects, therefore, an apparatus, and an associated methodology, is provided for facilitating identification of packet service capability available to a dedicated-mode-connected mobile station. A detector is configured to detect delivery of an information element that includes identification of the packet service capability available at the cell. A reporter is configured to report the indication contained in the information element detected by the detector.

Referring first, therefore, to FIG. 1, a communication system, shown generally at 10, provides for radio communications with mobile stations, of which the mobile station 12 is representative. In the exemplary implementation, the communication system comprises a GSM (Global System for Mobile communications)—based system that provides for EGPRS (Enhanced General Packet Radio Service), or EDGE (Enhanced Data for GSM Evolution) communication services. More generally, the communication system 10 is representative of any of various radio communication systems that potentially provide for data communication services. The communication system is, for example, also representative of a system that provides, in one or more cells thereof, one or more Evolved EDGE features.

The communication system includes a network part 14 having network entities, here including a Base Transceiver Station (BTS) 18. Communications are effectuated between the network part and a mobile station by way of channels defined upon a radio air interface, here represented by the arrow 22. Data originated at the network is communicated on downlink channels to the mobile station. And, data originated at the mobile station is communicated upon uplink channels defined upon the radio air interface.

The mobile station is configured to be operable both pursuant to circuit-switched communications and pursuant to packet-switched communications. The mobile station, when operated pursuant to a circuit-switched communication service, is maintained in a dedicated-mode connection with dedicated communication channels, dedicated to the mobile station for the performance of the circuit-switched communication service. As noted previously, when the mobile station is connected in a dedicated-connection, such as a circuit-switched connection, the mobile station conventionally is not provided with an indication of the packet-service capability of the network with which the mobile station is positionable in the communication connectivity. Because the mobile station is not aware of the packet-service capability, a user of the mobile station might erroneously conclude that the packet-communication capability is different from the actual capability.

For instance, if the mobile station is connected in a circuit-switched connection pursuant to a circuit-switched communication session at a first cell, and communications are handed off to a successor cell, the mobile station continues to indicate that the packet connection capability are those of the predecessor cell and not those of the successor cell as, conventionally, the mobile station is not provided with updated information of the packet communication capabilities at the successor cell until a DTM session is initiated.

An embodiment of the present disclosure provides a manner by which to notify the mobile station of the packet communication capability of the serving cell in which the mobile station is positioned. The mobile station is notified of the capability while the mobile station is in a circuit-switched connection. Through such notification, the mobile station is earlier provided with an indication of the packet service capability of the serving cell. In the event that a user of the mobile station bases a determination of whether to perform a packet-switched service based upon the packet-switched communication capacity of the serving cell, the user is able to base a determination upon an accurate indication of the packet communication capability of the serving cell. Outdated, or erroneous, information is superseded by the correct information.

An embodiment of the present disclosure provides an apparatus 44 embodied at a network entity, here the base transceiver station 18, of the network part 14 of the communication system. The apparatus is functionally represented, implementable in any desired manner, including, e.g., by algorithms executable by processing circuitry. The elements of the apparatus, while shown at a single physical location, are, in other implementations, distributed amongst more than one logical, or physical entity.

The apparatus 44 is here shown to include a message generator 48, a message sender 52, and a populator 54. The message generator operates to generate a message that includes an indication of the packet-communication connectivity capabilities of the network entity, here the base transceiver station 18, with which the message generator is associated.

In the exemplary implementation, the message generated by the message generator includes a field that is populated by the populator 54 with a value that indicates the packet service capability of the associated network entity. In the exemplary implementation, the message comprises an SI 6 message that contains a rest octet that includes a single-bit field that is populated with a value to indicate whether the associated network entity provides EGPRS service, that is to say, whether the associated network entity supports EGPRS. An exemplary format of the rest octet that forms part of the SI 6 message generated by the message generator is as follows:

```
<SI6 rest octets> ::=
{ L I H <PCH and NCH info>}
{ L I H <VBS/VGCS options : bit(2)>}
{ < DTM_support : bit == L >
I < DTM_support : bit == H >
< EGPRS_support : bit == L >
I < EGPRS_support : bit == H >
< RAC : bit (8) >
< MAX_LAPDm : bit (3) > }
< Band indicator >
{ L | H < GPRS_MS_TXPWR_MAX_CCH : bit (5) > }
{ L | H -- MBMS procedures supported by the cell
< DEDICATED_MODE_MBMS_NOTIFICATION_SUPPORT: bit >
< MNCI_SUPPORT: bit >}
< spare padding >;
```

Another exemplary format of the rest octet that forms part of the SI 6 message generated by the message generator in another implementation provides for identification of DCDL (Dual Carrier in the Downlink) support and is as follows:

```
<SI6 rest octets> ::=
{ L I H <PCH and NCH info>}
{ L I H <VBS/VGCS options : bit(2)>}
{ < DTM_support : bit == L >
I < DTM_support : bit == H >
< GPRS_support : bit == L >
I < GPRS_support : bit == H > -------------> GPRS supported or not
< EGPRS_support : bit == L >
I < EGPRS_support : bit == H > ------------> EGPRS supported or not
  < EGPRS2_support : bit == L >
  I < EGPRS2_support : bit == H > ---------> EGPRS2 supported or not
<DCDL_support : bit == L>
I <DCDL_support : bit==H> -----------> DCDL supported or not
< RAC : bit (8) >
< MAX_LAPDm : bit (3) > }
< Band indicator >
{ L | H < GPRS_MS_TXPWR_MAX_CCH : bit (5) > }
{ L | H -- MBMS procedures supported by the cell
< DEDICATED_MODE_MBMS_NOTIFICATION_SUPPORT:
bit >
< MNCI_SUPPORT: bit >}
< spare padding >;
```

The EGPRS_support field in the first-shown example message rest octet is a single-bit field that is of a high value when the network entity, here the base transceiver station that defines the serving cell, is EGPRS-capable. And, the field is of a low value when the network entity does not support EGPRS. In other implementations, other logical configurations, and field sizes of other bit lengths are, instead, used. For instance, as shown in the second-shown example message rest octet, an EGPRS2 support field and a DCDL_support field is shown, together with a GPRS_support field and an EGPRS_support field. That is to say, if a cell of the system provides EGPRS2 capacity and or DCDL capability, then the SI 6, or other message, is correspondingly altered to reflect the different capability of the serving cell.

In a further implementation, the octet is further adapted to identify which of other various Evolved Edge features are supported. Analogous, additional or alternate, fields are included in the message.

Another exemplary format of the rest octet that forms part of the SI 6 message generated by the message generator in another implementation is as follows:

```
<SI6 rest octets> ::=
  { L I H <PCH and NCH info>}
  { L I H <VBS/VGCS options : bit(2)>}
  {    < DTM_support : bit == L >
    I    < DTM_support : bit == H >
      < RAC : bit (8) >
      < MAX_LAPDm : bit (3) > }
```

-continued

```
< Band indicator >
{ L | H   < GPRS_MS_TXPWR_MAX_CCH : bit (5) > }
  { L | H         -- MBMS procedures supported by the cell
      < DEDICATED_MODE_MBMS_NOTIFICATION_SUPPORT: bit >
        < MNCI_SUPPORT: bit >}
      {    L   -- Receiver compatible with earlier release
         | H   -- Additions in Release 7 :
              { 0 | 1 <AMR Config:bit(4)> }
< GPRS_support : bit == L >
I < GPRS_support : bit == H >       -- GPRS supported or not
< EGPRS_support : bit == L >
I < EGPRS_support : bit == H >      -- EGPRS supported or not
< EGPRS2_support : bit == L >
I < EGPRS2_support : bit == H >     -- EGPRS2 supported or not
< DCDL_support : bit == L >
I < DCDL_support : bit == H >       -- DCDL supported or not
  < spare padding >;
```

In this embodiment, the rest octet includes information that identifies whether the cell supports GPRS, EGPRS, EGPRS2, or DCDL. The GPRS support field, here a one-bit field is of a first, e.g., 'L', value if GPRS is not supported. And, the field is of a second, e.g., 'H', value if GPRS is supported. Analogously, the EGPRS support field, here also a one-bit field is of a first value, e.g., 'L' value, if EGPRS is not supported and of a second value, e.g., 'H' value if EGPRS is not supported. The EGPRS2 support field, also here a one-bit field is of a first, e.g., 'L', value if EGPRS2 is not supported and is of a second, e.g., 'H', value if EGPRS2 is supported. The DCDL support field, also here a one-bit field is of a first, e.g., 'L', value if DCDL is not supported and is of a second, e.g., 'H', value if DCDL is supported.

And, in another embodiment, the SI6 rest octet also identifies whether the cell supports GPRS, EGPRS, and EGPRS2, or DCDL. In this embodiment, the <SI6 rest octet> is formatted as follows:

```
{L I H <PCH and NCH info>}
  {L I H <VBS/VGCS options : bit(2)>}
  {    < DTM_support : bit == L >
    I   < DTM_support : bit == H >
       < RAC : bit (8) >
       < MAX_LAPDm : bit (3) > }
< Band indicator >
{ L | H   < GPRS_MS_TXPWR_MAX_CCH : bit (5) > }
  { L | H         -- MBMS procedures supported by the cell
    < DEDICATED_MODE_MBMS_NOTIFICATION_SUPPORT:
    bit >
    < MNCI_SUPPORT: bit >}
    {    L   -- Receiver compatible with earlier release
       | H   -- Additions in Release 7 :
            { 0 | 1 <AMR Config:bit(4)> }
    }
{L | H < PS capability information >}
  < spare padding >;
  And, the <PS capability information> field is defined by:
<GPRS support : bit(1)>
<EGPRS support : bit(1)>
<EGPRS2 support : bit(1)>;
<DCDL support : bit(1)>;
```

In another embodiment, the {L|H<PS capability information: bit(2)>} comprises a two-bit field in which the field indicates the PS capability of the serving cell, e.g., as follows:

| Bit 12 | |
|---|---|
| 00 | GPRS supported by the serving cell |
| 01 | EGPRS supported by the serving cell |
| 11 | EGPRS2 supported by the serving cell |

Alternatively, the {L|H<PS capability information: bit(2)>} comprises a two-bit field in which the field indicates the PS capability of the serving cell, and a possible extension indicator for currently undefined values e.g., as follows:

| Bit 12 | |
|---|---|
| 00 | GPRS supported by the serving cell |
| 01 | EGPRS supported by the serving cell |
| 10 | EGPRS2 supported by the serving cell |
| 11 | Reserved for future use |

In one implementation, EGPRS refers to the addition of another modulation scheme, e.g., an 8-PSK modulation scheme, over GPRS. And an EGPRS2 modulation scheme refers to a higher-level modulation scheme, e.g., a 16-QAM or a 32-QAM modulation scheme. In this implementation, the two-bit field identifies the service-support to indicate whether GPRS, EGPRS, EGPRS2, or DCDL, e.g., is supported.

In other scenarios that have other numbers of services that are potentially available, the field is corresponding in length, e.g., to be of a field length greater than two to identify additional services or, e.g., to be of a field length less than two to identify the services when fewer services are potentially available.

Once generated, and populated with the appropriate bit value or values, the message is provided to the message sender 52 that operates to send the message, indicated by the arrow 58 for delivery to the mobile station 12.

The mobile station includes further apparatus, shown at 62, of an embodiment of the present disclosure. The apparatus 62 is also functionally represented, form the functional entities, formed in any desired manner, including, for instance, algorithms executable by processing circuitry. Here, the apparatus 62 includes a message detector 66, a reporter 68, and a user display 74.

The message detector 66 operates to detect the message 58 sent thereto by the network entity 18. The detector extracts informational content from the delivered message. In the exemplary implementation in which the message forms an SI 6 message, or a message containing such an octet, the message detector operates to detect the value of the single-bit value of the single-bit, EGPRS supported field to be made available to the reporter 68. The reporter reports on the value of the field or otherwise reports upon the detected packet-service capabilities of the associated network entity, or otherwise reports on the detected packet-service capabilities of the associated network entity that are also supported by the mobile station. That is to say, the report identifies the service or services supported at the cell that are also part of the mobile station packet capability.

A report generated by the reporter is provided to the user display 74. The user displays an icon, or other indication, that identifies the packet service capability available to the mobile station. An icon 76 is representative of an exemplary icon displayable at the user display. The icon forms, for instance, an acronym EDGE, EGPRS, EGPRS2, DCDL, DC, or other appropriate indication when the high-speed packet service capability is available. Conversely, if only a lower-speed capability is available, an indication of the low-speed capability is instead provided, or, in an alternate implementation, no icon is displayed when only a low-speed, or no packet service is available. For instance, if only GPRS, and not EDGE is provided, then a GPRS-only indication is displayed.

The message 58 is sent to, and detected by, the mobile station even when, and while, the mobile station is connected in a circuit-switched connection with the network. In contrast to conventional schemes in which the mobile station is unaware of the actual packet-service capabilities until initiation of a DTM session, operation of the apparatus 44 and 62 provide the user of the mobile station with an updated, and accurate, indication.

Figure 2:
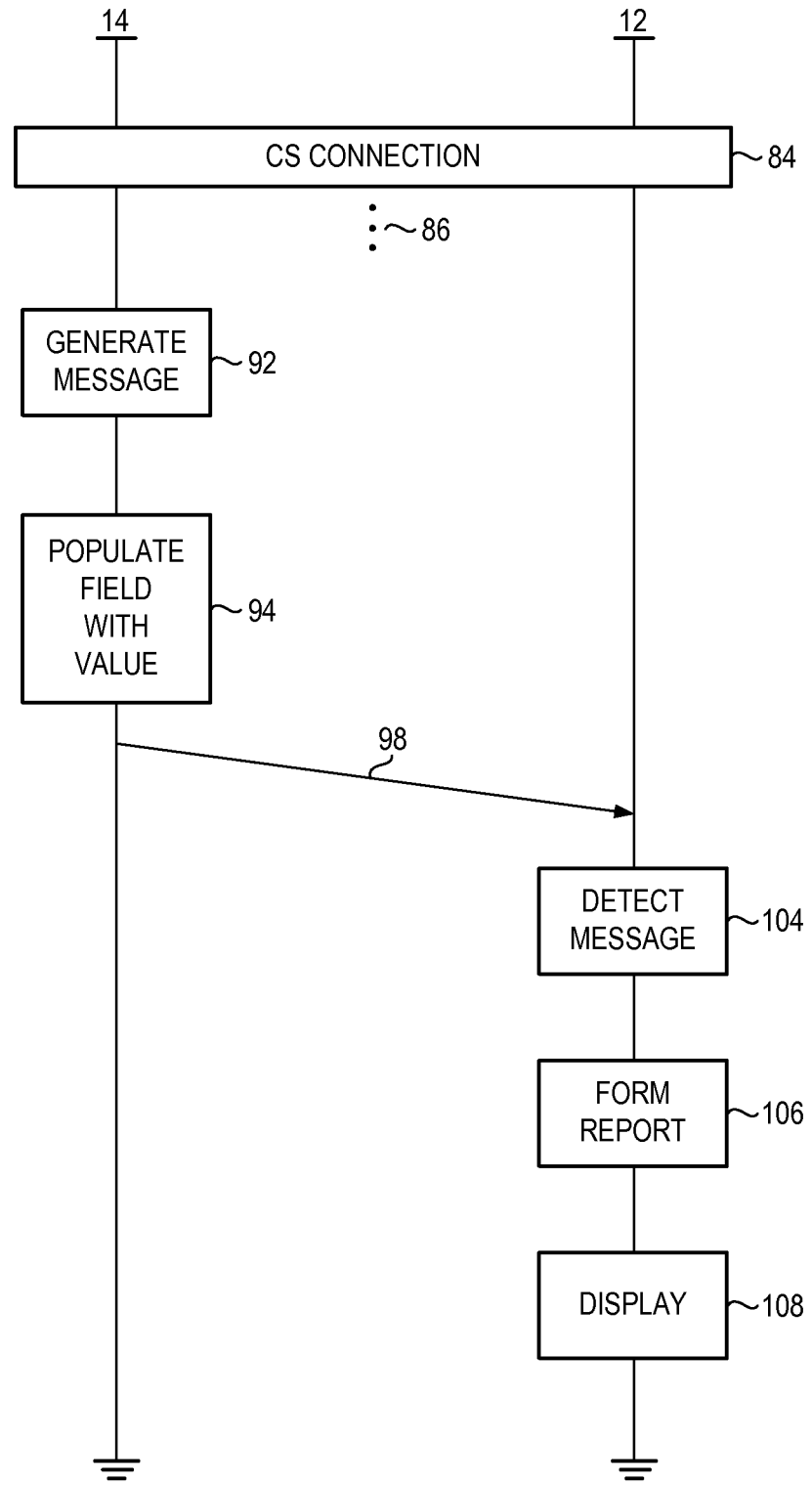
FIG. 2 illustrates a signaling diagram representative of signaling generated during operation of an embodiment of the present disclosure.

FIG. 2 illustrates a signaling diagram, shown generally at 82, representative of the process of operation of an embodiment of the present disclosure. Here, and as indicated by the block 84, the network 14 and the mobile station 12 are connected in a circuit-switched connection. While maintained in the circuit-switched connection, indicated by the continuances 86, a message, here an SI 6 rest octet, is generated, indicated by the block 92. Then, and as indicated by the block 94, the message is populated with a bit that identifies the packet-service capabilities of the network part with which the mobile station communicates. Once generated, the message is sent, indicated by the segment 98 for delivery to the mobile station. The mobile station detects, indicated by the block 104, the communicated message. And, a report indicated by the block 106 is made of the packet-service capability of the network. And, as indicated by the block 108, the detected capability is displayed at a user display. Thereby, a user of the mobile station is provided with an indication of the actual packet-service capabilities of the network entity with which the mobile station shall communicate. A user of the mobile station is able to select better whether to perform a packet-switched communication service in light of the packet-service capabilities that are available.

Figure 3:
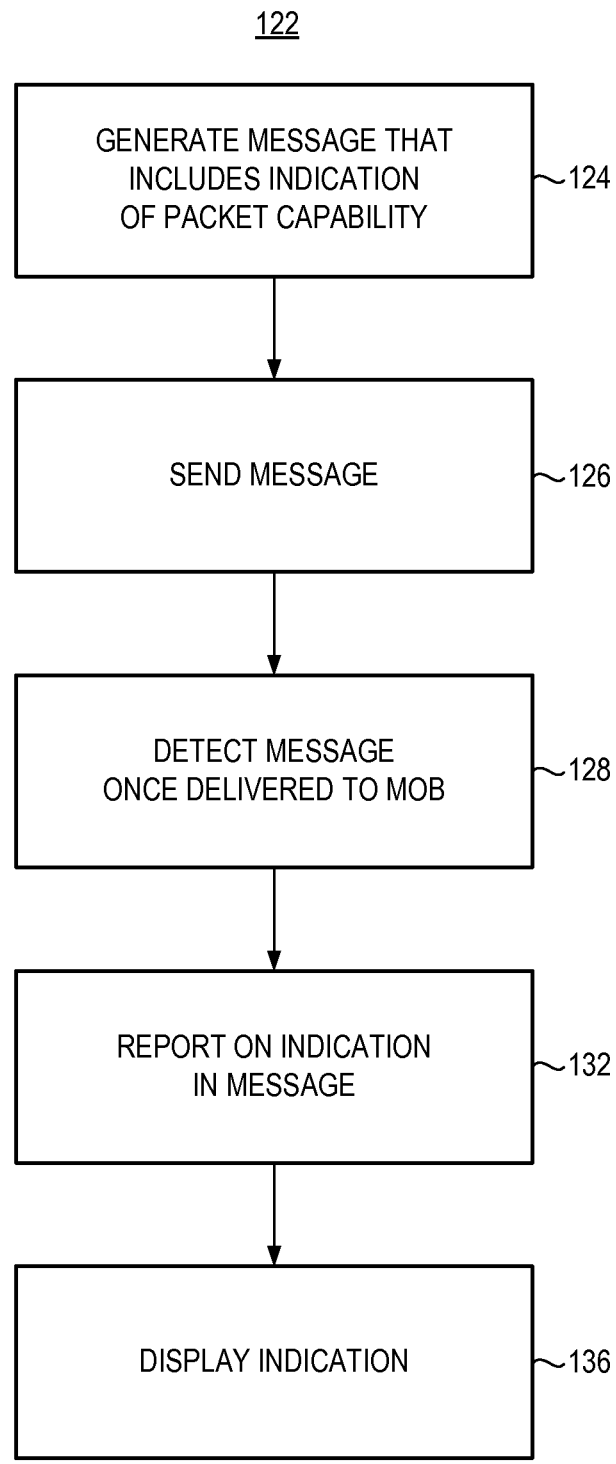
FIG. 3 illustrates a method flow diagram representative of the method of operation of embodiment of the present disclosure.

FIG. 3 illustrates a method flow diagram, shown generally at 122, representative of the method of operation of an embodiment of the present disclosure. The method facilitates identification of service coverage at a coverage area.

First, and as indicated by the block 124, a message is generated that includes an indication indicative of coverage area packet capability. Then, and as indicated by the block 126, the message is sent.

Thereafter, and as indicated by the block 128, delivery of the message at a mobile station is detected. Then, and as indicated by the block 132, a report is made of the indication contained in the message or of the indication contained in the message combined with the mobile station's capabilities. And, as indicated by the block 136, the reported indication is displayed at a user display.

Thereby, a user of a mobile station is provided with an accurate indication of the packet-service capabilities with which the mobile station is in connectivity.

Presently preferred embodiments of the disclosure and many of its improvements and advantages have been described with a degree of particularity. The description is of preferred examples of implementing the disclosure, and the description of preferred examples is not necessarily intended to limit the scope of the disclosure. The scope of the disclosure is defined by the following claims.

What is claimed is:

1. An apparatus for facilitating identification of packet service capability available to a circuit-switched-dedicated-mode connected mobile station at a serving cell of a network, said apparatus comprising:
   processing circuitry for receiving at least one message from an entity of the network while operating on the circuit-switched-dedicated-mode connection at the serving cell and prior to initiation of a Dual Transfer Mode (DTM) session at the serving cell, the at least one message including a first information element indicating whether DTM support is available in the serving cell, and a second information element that includes identification of the DTM packet service capability available in the serving cell;
   a detector, disposed at the circuit-switched-dedicated-mode connected mobile station, configured to detect delivery of the first and second information elements; and
   a reporter configured to report the indication contained in the first and second information elements detected by said detector.

2. The apparatus of claim 1 wherein said detector is configured to detect delivery of the second information element that includes an indication of whether the DTM packet service capability includes EDGE, Enhanced Data for GSM Evolution, capability.

3. The apparatus of claim 1 wherein the indication is indicative of whether the DTM packet service capability includes EDGE capability and comprises a single bit field of the second information element.

4. The apparatus of claim 1 wherein said detector is configured to detect delivery of the second information element that includes an indication of whether the DTM packet service capability includes GPRS, General Packet Radio Service, capability.

5. The apparatus of claim 4 wherein the indication of whether the DTM packet service capability includes GPRS capability comprises a single bit field of the second information element.

6. The apparatus of claim 1 wherein said detector is configured to detect delivery of the second information element that includes an indication of whether the DTM packet service capability includes EGPRS2, Evolved Data for GSM Evolution, capability.

7. The apparatus of claim 6 wherein the indication of whether the DTM packet service capability comprises a single bit field of the second information element.

8. The apparatus of claim 1 wherein said detector is configured to detect delivery of the second information element that includes an indication of whether the DTM packet service capability includes DCDL, Dual Carrier in the Downlink for GSM Evolution, capability.

9. The apparatus of claim 1 wherein said detector is configured to detect delivery of an SI 6 Rest octet that includes the identification of the DTM packet service capability.

10. The apparatus of claim 1 further comprising a user display configured to display the report made by said reporter.

11. The apparatus of claim 10 wherein said user display is configured to display an icon representative of the DTM packet service capability.

12. The apparatus of claim 10 wherein said user display is configured to display an icon representative of a logical combination of the DTM packet service capability and a mobile station packet capability.

13. The apparatus of claim 1 wherein said detector is configured to detect the second information element that includes a GPRS, General Packet Radio Service, support field, an EGPRS, Enhanced GPRS, support field, and an EGPRS2, Evolved Data for GSM Evolution, support field, each populated with a value identifying, respectively availability of GPRS, EGPRS, and EGPRS2 at the cell.

14. The apparatus of claim 1 wherein said detector is configured to detect the second information element that includes a GPRS, General Packet Radio Service, support field, an EGPRS, Enhanced GPRS, support field, an EGPRS2, Evolved Data for GSM Evolution, support field, and a DCDL, Dual Carrier in the Downlink for GSM Evolution, support field, each populated with a value identifying, respectively availability of GPRS, EGPRS, EGPRS2, and DCDL at the cell.

15. The apparatus of claim 1 wherein said detector is configured to detect the second information element that identifies which of: GPRS, EGPRS, and EGPRS2 is supported.

16. The apparatus of claim 1 wherein the identification included in the second information element of the DTM packet service capability comprises a two-bit field.

17. A method for facilitating identification of packet service capability available to a circuit-switched-dedicated-mode connected mobile station at a serving cell of a network, said method comprising:
receiving at least one message from an entity of the network while operating on the circuit-switched-dedicated-mode connection at the serving cell and prior to initiation of a Dual Transfer Mode (DTM) session at the serving cell, said at least one message including a first information element indicating whether DTM support is available in the cell, and a second information element that includes identification of the DTM packet service capability available in the serving cell;
detecting, by the circuit-switched-dedicated-mode connected mobile station, delivery of the first and second information elements; and
reporting the indication contained in the first and second information elements.

18. The method of claim 17 wherein said detecting comprises detecting delivery of the second information element that includes an indication of whether the DTM packet service capability includes, EDGE, Enhanced Data For GSM Evolution, capability.

19. The method of claim 17 wherein the indication is indicative of whether the DTM packet service capability includes EDGE capability comprises a single bit field of the message.

20. The method of claim 17 wherein said detecting comprises detecting delivery of the second information element that includes an indication of whether the DTM packet service capability includes, GPRS, General Packet Radio Service, capability.

21. The method of claim 17 wherein said detecting comprises detecting delivery of the second information element that includes an indication of whether the DTM packet service capability includes EGPRS2, Evolved Data for GSM Evolution, capability.

22. The method of claim 17 wherein said detecting comprises detecting delivery of the second information element that includes an indication of whether the DTM packet service capability includes DCDL, Dual Carrier in the Downlink for GSM Evolution, capability.

23. A method for facilitating identification of packet service capability available to a circuit-switched-dedicated-mode connected mobile station at a serving cell of a network, said method comprising:
receiving at least one message from an entity of the network while operating on the circuit-switched-dedicated-mode connection at the serving cell and prior to initiation of a Dual Transfer Mode (DTM) session at the serving cell, said at least one message including a first information element indicating whether DTM support is available in the cell, and a second information element that includes identification of the DTM packet service capability available in the serving cell;
detecting, by the circuit-switched-dedicated-mode connected mobile station, delivery of the second information element that includes identification of the packet service capability available at the serving cell;
creating a logical combination of the indication contained in the first and second information elements and mobile-station capabilities; and
reporting the logical combination of the indication contained in the first and second information elements and the mobile-station capabilities.

24. The method of claim 23 wherein said detecting comprises detecting delivery of the second information element that includes an indication of whether the DTM packet service capability includes EDGE, Enhanced Data For GSM Evolution, capability.

25. The method of claim 23 wherein the indication is indicative of whether the DTM packet service capability includes EDGE capability comprises a single bit field of the message.

26. The method of claim 23 wherein said detecting comprises detecting delivery of the second information element that includes an indication of whether the DTM packet service capability includes GPRS, General Packet Radio Service, capability.

27. The method of claim 23 wherein said detecting comprises detecting delivery of the second information element that includes an indication of whether the DTM packet service capability includes EGPRS2, Evolved Data for GSM Evolution, capability.

28. The method of claim 23 wherein said detecting comprises detecting delivery of the second information element that includes an indication of whether the DTM packet service capability includes DCDL, Dual Carrier in the Downlink for GSM Evolution, capability.

29. An apparatus for facilitating identification of packet service capability available at a serving cell of a network, said apparatus comprising:
an entity implemented in the network and including:
a generator configured to generate a first information element identification of dual transfer mode (DTM) capability and a second information element identification of the DTM packet service capability available at the serving cell; and a broadcaster configured to broadcast at least one message including the first and second information elements generated by said generator to a circuit-switched-dedicated-mode connected mobile station prior to initiation by the circuit-switched-dedicated-mode mobile station of a DTM session.

30. The apparatus of claim 29 wherein said generator is configured to generate the second information element that includes a GPRS, General Packet Radio Service, support field, an EGPRS, Enhanced GPRS, support field, and an EGPRS2, Evolved Data for GSM Evolution, support field, each populated with a value identifying, respectively availability of GPRS, EGPRS, and EGPRS2 at the cell.

31. The apparatus of claim 29 wherein said generator is configured to generate the second information element that includes a GPRS, General Packet Radio Service, support field, an EGPRS, Enhanced GPRS, support field, an EGPRS2, Evolved Data for GSM Evolution, support field, and a DCDL, Dual Carrier in the Downlink for GSM Evolution, support field, each populated with a value identifying, respectively availability of GPRS, EGPRS, EGPRS2 and DCDL at the cell.

32. A method for facilitating identification of DTM packet service capability available at a serving cell of a network, said method comprising:
    generating an information element that includes an identification of the dual transfer mode (DTM) support and an identification of the DTM packet service capability available at the serving cell; and
    broadcasting the information element in a message from an entity of the network to a circuit-switched-dedicated-mode connected mobile station prior to initiation by the circuit-switched-dedicated-mode mobile station of a DTM session.

\* \* \* \* \*